(12) United States Patent
Mueller et al.

(10) Patent No.: US 11,375,848 B2
(45) Date of Patent: Jul. 5, 2022

(54) HOT BEVERAGE PREPARATION APPARATUS COMPRISING A CONTINUOUS FLOW HEATER

(71) Applicant: Franke Kaffeemaschinen AG, Aarburg (CH)

(72) Inventors: Simon Mueller, Muhen (CH); Serge Waechter, Basel (CH)

(73) Assignee: Franke Kaffeemaschinen AG, Aarburg (CH)

(*) Notice: Subject to any disclaimer, the term of this patent is extended or adjusted under 35 U.S.C. 154(b) by 419 days.

(21) Appl. No.: 16/441,437

(22) Filed: Jun. 14, 2019

(65) Prior Publication Data
US 2019/0380530 A1  Dec. 19, 2019

(30) Foreign Application Priority Data

Jun. 18, 2018 (DE) .......................... 102018114576.4

(51) Int. Cl.
| | |
|---|---|
| A47J 31/46 | (2006.01) |
| A47J 31/54 | (2006.01) |
| A47J 31/00 | (2006.01) |
| A47J 31/34 | (2006.01) |
| A47J 31/057 | (2006.01) |

(52) U.S. Cl.
CPC .......... *A47J 31/545* (2013.01); *A47J 31/007* (2013.01); *A47J 31/0573* (2013.01); *A47J 31/34* (2013.01); *A47J 31/469* (2018.08); *A47J 31/461* (2018.08)

(58) Field of Classification Search
CPC .. A47J 31/24; A47J 31/34; A47J 31/36; A47J 31/461; A47J 31/0573; A47J 31/0663; A47J 31/0668; A47J 31/0657
See application file for complete search history.

(56) References Cited

U.S. PATENT DOCUMENTS

| | | | |
|---|---|---|---|
| 8,383,181 B2 | 2/2013 | Daburger et al. | |
| 2013/0101718 A1* | 4/2013 | Kindler | A47J 31/4485 426/474 |
| 2014/0348996 A1* | 11/2014 | Fischer | A23F 5/267 426/433 |
| 2016/0084527 A1 | 3/2016 | Baumgart et al. | |

(Continued)

FOREIGN PATENT DOCUMENTS

| | | | |
|---|---|---|---|
| CA | 2677495 A1 * | 3/2010 | A47J 31/461 |
| CH | 709738 | 12/2017 | |
| DE | 102008028031 | 12/2009 | |

(Continued)

*Primary Examiner* — Reginald Alexander
(74) *Attorney, Agent, or Firm* — Volpe Koenig (57) ABSTRACT

In order to reduce limescale formation on the continuous flow heater during operation of an apparatus for preparing freshly brewed hot beverages which has a hot water generator, which is embodied as a continuous flow heater, and a brewing apparatus, to which hot water from the hot water generator can be supplied, a controller for actuating the continuous flow heater is provided, which controller switches on the continuous flow heater for the purpose of drawing a pre-specified quantity of hot water and switches off said continuous flow heater shortly before the quantity of hot water is completely output, so that the temperature of the hot water at the output of the continuous flow heater is declining at the end of the drawing operation.

10 Claims, 5 Drawing Sheets

(56) References Cited

U.S. PATENT DOCUMENTS

2017/0095111 A1* 4/2017 Riessbeck ............. A47J 31/542

FOREIGN PATENT DOCUMENTS

| | | |
|---|---|---|
| DE | 102010002440 | 9/2011 |
| DE | 102013207181 | 10/2014 |
| EP | 2612577 | 7/2013 |
| EP | 2705784 | 3/2014 |
| WO | 2013023963 | 2/2013 |
| WO | 2013189869 | 12/2013 |

* cited by examiner

HOT BEVERAGE PREPARATION APPARATUS COMPRISING A CONTINUOUS FLOW HEATER

INCORPORATION BY REFERENCE

The following documents are incorporated herein by reference as if fully set forth: German Patent Application No. DE 102018114576.4, filed Jun. 18, 2018.

BACKGROUND

The present invention relates to an apparatus for preparing freshly brewed hot beverages, comprising at least one hot water generator and comprising a brewing apparatus to which hot water from the hot water generator can be supplied, where the hot water generator is a continuous flow heater.

Fully automatic coffee machines which prepare freshly brewed coffee beverages in a portioned manner at the push of a button are known from the prior art. The hot water required for this purpose is normally stored in a hot water boiler, with the result that there is no need for a long heating-up time. Coffee machines in which water is heated by a continuous flow heater at the time at which the beverage is drawn have also been proposed separately. For example, document DE 10 2008 028 031 A1 describes a coffee machine for coffee capsules in which water is heated using a continuous flow heater.

It is also known that, in the case of fully automatic coffee machines, limescale has to be removed from the hot water generator from time to time. In this regard, for example, solutions such as in WO 2013/023963 A1 or EP 2705784 A1, in which a cartridge with a water-soluble limescale-removing agent is inserted or connected to the apparatus in order to carry out a limescale-removing process, are known. In CH 709738, a limescale-removing agent application apparatus with a limescale-removing solution accommodated in a container of variable volume is connected to the coffee machine.

Disadvantages of using a continuous flow heater for providing hot water are a usually long heating-up time and the strong tendency for limescale to form, primarily when operating at a high heating power for heating up water quickly.

SUMMARY

The object of the present invention is to specify a hot beverage preparation apparatus comprising a continuous flow heater, in which apparatus limescale forms on the continuous flow heater less quickly.

The object is achieved by hot beverage preparation apparatus having one or more features of the invention. Advantageous refinements can be found below and in the claims. A corresponding method for preparing freshly brewed hot beverages is also provided.

The invention is based on the finding that hot water remaining in the continuous flow heater, primarily when this is left standing after the end of a beverage drawing operation, makes a significant contribution to the formation of limescale on the continuous flow heater. Therefore, the invention provides measures for cooling down the continuous flow heater as rapidly as possible after a beverage drawing operation. The continuous flow heater is actuated by a controller. According to the invention, said controller is designed such that it switches on the continuous flow heater for the purpose of drawing a pre-specified quantity of hot water but switches off said continuous flow heater again shortly before the quantity of hot water is completely drawn. The temperature of the hot water at the output of the continuous flow heater is therefore already declining at the end of the drawing operation. If the flow of water is stopped after the end of the drawing operation, the residual water remaining in the continuous flow heater and the following lines is therefore at a lower temperature than during the beverage preparation operation, and therefore less limescale is deposited from the water.

A drainage valve which is arranged downstream of the continuous flow heater in the throughflow direction, which is designed as a controllable directional valve and by which the water flowing through the continuous flow heater can be conducted directly into a wastewater line or a wastewater collection container instead of in the direction of the brewing apparatus is preferably provided. The drainage valve can be opened during a heating-up phase of the continuous flow heater and the water arriving from the continuous flow heater can be conducted into the wastewater line or the wastewater collection container. The heating-up phase is preferably executed each time a hot beverage is drawn, that is to say the continuous flow heater is operated only during a product drawing operation and then turned off.

Furthermore, a directional valve is provided between the continuous flow heater and the brewing apparatus. In order to further post-cool the continuous flow heater, the controller is designed to close the directional valve after the end of a hot water drawing operation, to open the drainage valve and, when the continuous flow heater is switched off, to once again activate a flow of water through the continuous flow heater.

The heating arrangement is preferably switched off after between 85% and 95% of the volume of water pre-specified for the beverage preparation operation has flowed through the continuous flow heater. Here, the volume is determined by a throughflow meter which is located in the supply line. The slight cooling down of the last 5%-15% of the quantity of water does not have an adverse effect on the beverage quality according to findings by the inventors. Firstly, at least a significant portion of said quantity of water remains in the lines between the continuous flow heater and the outflow as residual water in any case and is then discharged or blown out into the drain. The low proportion of a few percent of slightly cooler "hot water" cannot be noticed by a consumer either from the temperature of the ready beverage or from the taste of said beverage. The important constituent parts of the material to be brewed—for example ground coffee or tea leaves—which are subject to the action of water have already been collected by the hot water which passes through before the heating arrangement is switched off, and therefore the last 5%-10% of the quantity of water has minimal influence on the contents of the ready beverage.

A heating cartridge, which has a cylindrical inner body and an outer jacket, which surrounds said cylindrical inner body, and in which a helically running flow duct for water which is to be heated is formed between the lateral surface of the inner body and the inner side of the jacket, preferably serves as the continuous flow heater within the scope of the present invention. A heating cartridge of this kind is particularly compact and renders possible particularly quick heating up on account of having a low thermal mass.

With this construction, the electrical heating arrangement is designed as a heating coil which runs within the cylindrical inner body in a helical manner around the center axis of said cylindrical inner body. In particular, the heating coils can be wound around an axially arranged heat-resistant core, for example a ceramic core. The intermediate space between the heating coils and the outer skin of the inner body can be filled with a pulverulent material which is firstly electrically insulating and secondly thermally conductive, such as magnesium oxide or another oxide powder for example.

In order to ensure a throughflow rate which is as constant as possible, a water pump which conveys water from a drinking water supply line to the continuous flow heater can also be provided. Here, the pumping output of the water pump can also be controllable or controllable by the controller. Therefore, a flow of water through the continuous flow heater is activated by switching on the pump (one of the directional valves downstream of the pump is usually always open).

BRIEF DESCRIPTION OF THE DRAWINGS

Further advantages and properties of the present invention can be found in the following description of an exemplary embodiment with reference to the figures, in which.

DETAILED DESCRIPTION

Figure 1:
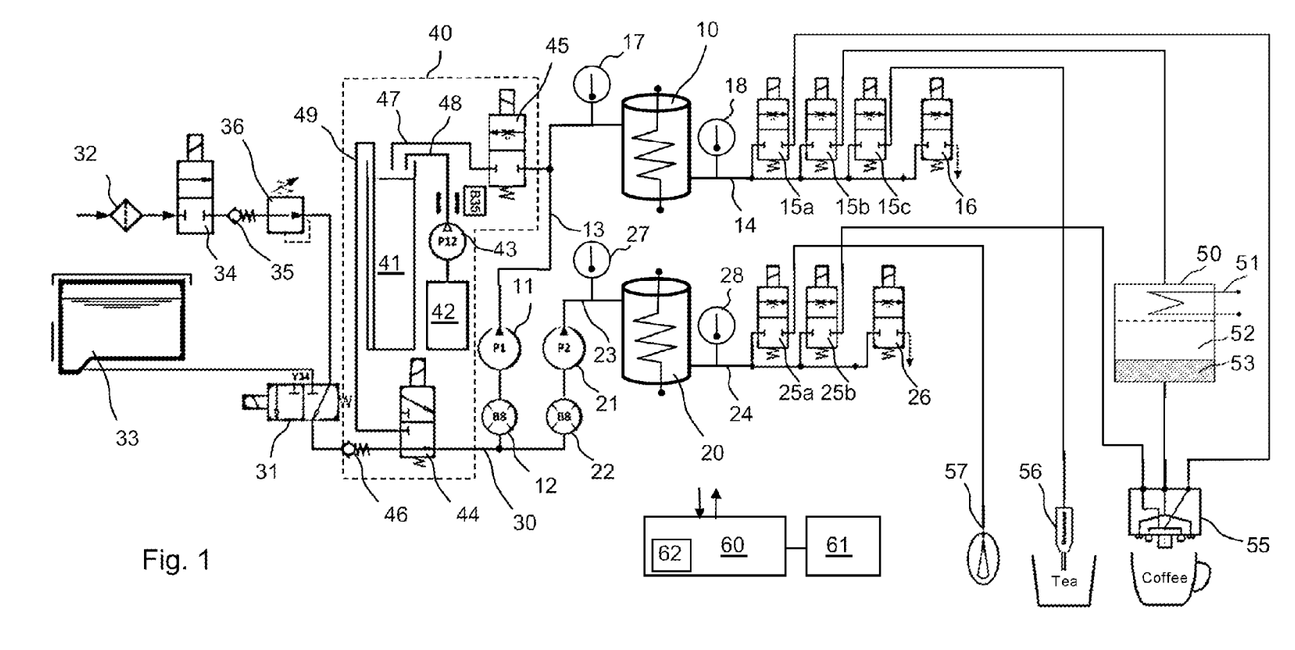
FIG. 1 shows a water flow diagram of a fully automatic beverage machine comprising two continuous flow heaters and an integrated limescale removal system for automatically removing limescale from the continuous flow heater.

FIG. 1 shows a so-called water flow diagram of the construction of an apparatus for preparing hot beverages, as is used in the case of a fully automatic coffee machine, for example. A continuous flow heater 10 serves for generating hot water with which hot beverages are prepared. A water pump 11 and a throughflow meter 12 are situated upstream of the continuous flow heater 10 in the water flow direction and are connected to the continuous flow heater 10 via a line 13. A plurality of directional valves 15a, 15b, 15c and 16 are connected to the hot water output of the continuous flow heater 10 via a line 14. A respective temperature sensor 17, 18 is also arranged at the input and at the output of the continuous flow heater 10.

In addition to the continuous flow heater 10 which is provided for preparing hot water, the apparatus has a second continuous flow heater 20 which serves for generating steam, which can likewise serve for preparing hot beverages, for example for reheating or for frothing milk or other beverages and which is not of further interest here. The second continuous flow heater 20, which serves here for generating steam, is likewise to be understood as being a hot water generator in the broader sense within the meaning of the present invention.

A water pump 21 and a throughflow meter 22 which are connected to the inflow of the continuous flow heater 20 via a line 23 are likewise located upstream of the second continuous flow heater 20. Various directional valves 25a, 25b, 26 are connected to the hot water or steam output of the continuous flow heater 20 via a line 24. As in the case of the continuous flow heater 10, a respective temperature sensor 27, 28 is also arranged at the input and at the output of the continuous flow heater 20, the function of which will likewise be explained below.

In the exemplary embodiment, the two throughflow meters 12, 22 are each arranged upstream of the associated pumps 11, 21. However, it would be possible in the same way for the throughflow meters 12, 22 to be arranged downstream of the associated water pumps 11, 21 in the flow direction. At the intake end, the two water pumps 11, 21 are connected to a drinking water connection 32 of the public supply network, or to a water tank 33 provided at or in the appliance, via a drinking water supply line 30 and an optional switchover valve 31. In the case of a connection to a public supply network 32, a shut-off valve 34, a non-return valve 35 and a pressure reducer 36 are provided in the supply line.

The water pump 11 conveys drinking water from the connected drinking water supply line 30 via the line 13 to the continuous flow heater 10, from where the hot water can be conveyed via the directional valve 15b to a brewing assembly 50. The brewing assembly 50 comprises, in a manner known per se, a heating arrangement 51, by way of which the supplied hot water can be brought to the boil or the brewing assembly can be preheated, and a brewing chamber 52, into which portioned, freshly ground coffee powder 53 is introduced. A brewing assembly which can be used within the scope of the present invention is described, for example, in EP 2561778 A1, to the full content of which reference is hereby made for the purpose of avoiding unnecessary repetitions.

The brewing assembly 50 is configured such that it can be opened in order to introduce a portioned quantity of coffee powder, this having been freshly ground in a portioned manner in a grinder of the fully automatic coffee machine beforehand. Moreover, the remaining coffee grounds can, with the brewing assembly open, be ejected into a grounds container after the brewing process. The brewing assembly also has a movable piston (not illustrated) which compresses the introduced coffee powder against a brewing sieve which is located in the brewing chamber. After the piston has moved back, the brewing water from the continuous flow heater 10, which brewing water is subjected to the pressure of the pump 11, can flow through the coffee powder compressed in said way. The ready-brewed coffee is conducted from the brewing assembly 50, via an outlet line, to an outflow 55 for coffee beverages. Hot water can be conducted directly to the outflow 55 by the directional valve 15a, for example for cleaning purposes or for preparing instant beverages. Furthermore, hot water can be also be conducted, via the directional valve 15c, to a separate hot water outlet 56 which serves, for example, for preparing tea.

Instead of a brewing assembly 50 as shown here, a brewing apparatus which is designed to receive so-called coffee capsules or coffee pods can also be used.

Steam which is generated by the second continuous flow heater 20 can either be conducted to a so-called steam lance 57 via the directional valve 25a, in order to froth milk for example, or steam can also be conducted to the outflow 55 via the directional valve 25b, in order to heat or to froth milk supplied via a separate line (not shown) for example.

Drainage valves 16 and 26 which are designed as directional valves serve for connecting the hot water output of the continuous flow heater 10 or of the continuous flow heater 20 to a so-called drain, that is to say a wastewater line or a wastewater collection container. This is necessary, amongst other things, for the purpose of removing limescale from the associated continuous flow heater 10, 20 in order to discharge the limescale-removing solution which is conducted through the continuous flow heaters 10, 20.

However, in addition, the two drainage valves 16, 26 also serve for conducting the through-flowing water into the wastewater line or the wastewater collection container in a heating-up phase of the associated continuous flow heater 10, 20. This ensures that heated water and steam are conducted in the direction of the associated outlet only after a pre-specified minimum temperature is reached. In contrast, water which is not yet hot enough during the heating-up process is discharged to the wastewater, that is to say cannot reach one of the outlets 55, 56, 57.

The automatic hot beverage machine shown in the exemplary embodiment also optionally has an integrated limescale removal system 40. The limescale removal system 40 comprises a mixing container 41, a storage container 42 for liquid limescale remover concentrate, and a metering pump 43. The common drinking water supply line 30 which is located at the intake end of the water pumps 11, 21 can be connected, via a switchover valve 44, to an intake line 49 which extends to the bottom of the mixing container 41, in order to draw in a limescale-removing agent solution from the mixing container 41 and to convey said solution to the continuous flow heaters 10, 20 for the purpose of limescale removal. Beforehand, the limescale-removing agent solution is mixed in the mixing container 41 by way of a meterable quantity of the limescale remover concentrate being conveyed by the metering pump 43 to the mixing container via the supply line 48.

Fresh water can be introduced, via the supply line 47, into the mixing container using the water pump 11 by a directional valve 45 which is connected to the supply line 13 which is connected at the delivery end to the pump 11. Here, the quantity of the fresh water introduced can be determined with the aid of the throughflow meter 12, with the result that, after a predetermined quantity of water has been introduced into the mixing container 41, the valve 45 can be closed.

After the limescale-removing agent solution has been mixed in the mixing container 41, the supply line 30 can be connected to the intake line 49 by the valve 44. Subsequently, the drainage valve 16 is opened and, by the water pump 11, the limescale-removing agent solution is conveyed from the mixing container 41 through the continuous flow heater 10. Subsequently, the switchover valve 44 is switched back to the operating position again, in which operating position the supply line 30 is connected to the public water connection 32 or to the water tank 33, and the continuous flow heater 10 is once again flushed with fresh water by the water pump 11. A non-return valve 46 prevents limescale-removing agent solution which is possibly still present in the supply line 30 from being able to flow back into the fresh water tank 33. In the same way, limescale can also be removed from the continuous flow heater 20 and said continuous flow heater can be cleaned by way of limescale-removing agent solution being conveyed by the water pump 21 from the mixing container 41 through the continuous flow heater 20 and into the outflow by the drainage valve 26.

Even though the continuous flow heater 20 serves for generating steam in the present exemplary embodiment, it is, within the meaning of the present invention, likewise to be understood as being a hot water generator in the broader sense. It is self-evident that the directional valve 45 of the limescale removal system 40 can also be connected to the water pump 21 via the line 23 instead of to the water pump 11 via the line 13.

The continuous flow heaters 10, 20 which are used in the present exemplary embodiment are compact continuous flow heaters in the form of so-called heating cartridges. A heating cartridge of this kind is shown in more detail in FIG. 2. Said heating cartridges have a thin-walled cylindrical inner body 102, the lateral surface 104 of which is provided, on the outside, with a helically running rib arrangement or helical groove 106 which is delimited to the outside by an outer cylindrical jacket 108 and therefore forms a flow duct for the supply water to be heated. A seal, for example in the form of a silicone sleeve 109 which prevents leakage flow transversely to the helical flow duct 106, can optionally be provided between the outer jacket 108 and the inner body 102.

Figure 2:
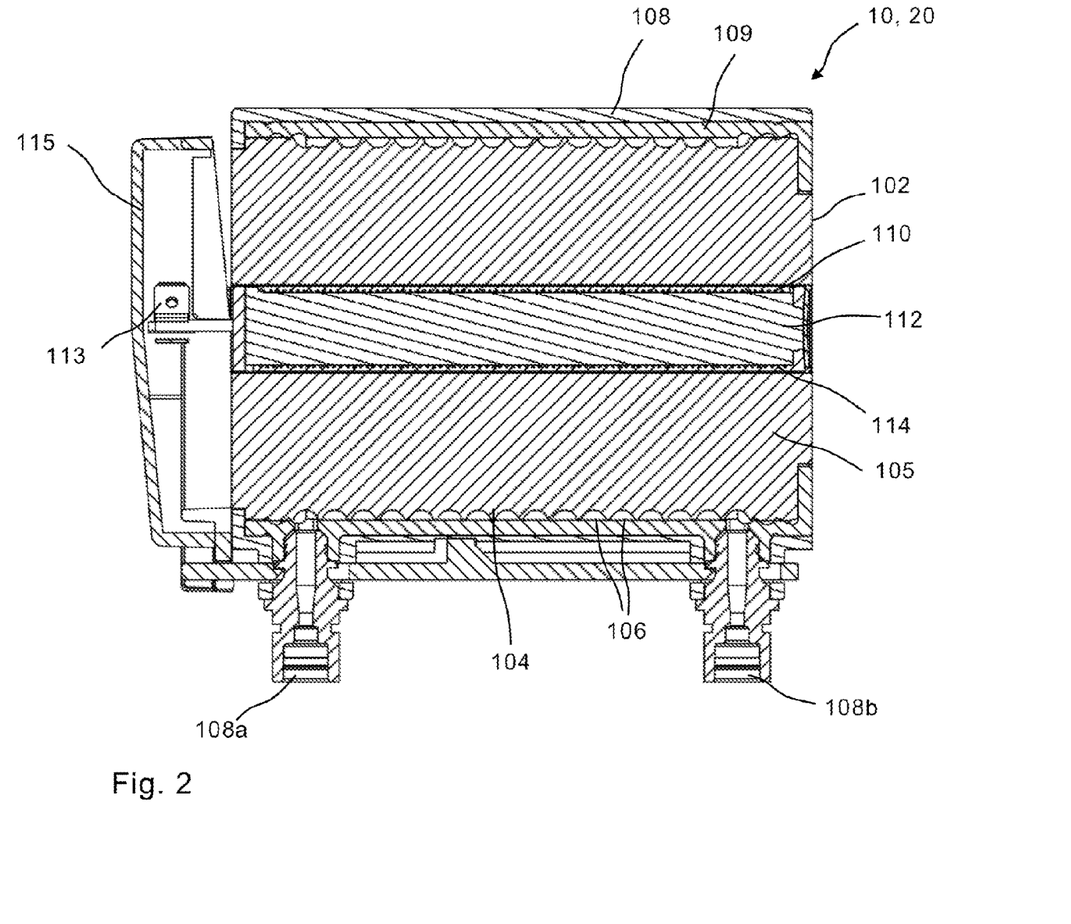
FIG. 2 shows a cross-sectional illustration of a continuous flow heater which is used within the scope of the invention.

A heating unit 110 which comprises a core 112 composed of heat-resistant material, for example ceramic, and electrical heating wires 114 which are wound around the core 112 is located in the interior of the inner body. The intermediate space between the outer skin of the inner body and the heating element 110 is filled with an electrically insulating material 105, in particular with a compressed, pulverulent material 105. In the present case, the intermediate space is filled with magnesium oxide.

Electrical connections 113 of the heating unit 110, of which only one can be seen in the shown section, are arranged at an end side of the continuous flow heater 10, 20. An end-side protective cap 115 covers and protects the electrical connections 113 against accidental contact.

The connections 108a, 108b which are connected to the supply and discharge lines for the water to be heated are attached to the outer sleeve 108.

The cylindrical inner body 102 can be produced from a food-grade stainless steel. The outer sleeve 108 is preferably composed of a heat-resistant plastic or likewise of stainless steel. The helical flow duct can also be formed on the inner surface of the outer sleeve 108 instead of in the lateral surface 104 of the inner body. The lateral surface 104 of the inner body 102 can be smooth, that is to say not embodied in a ribbed manner, in this case.

The fully automatic coffee machine described in the exemplary embodiment also has a programmable controller 60 with a processor 62 and has a user interface 61 which is connected to the controller 60, for example in the form of a touch-sensitive display or some other display and input unit. The functions of the water pumps 11, 21, all of the directional valves, the heaters 114a, 114b of the continuous flow heaters 10, 20 and the optional limescale removal system 40 and the metering pump 43 of the latter are actuated by the controller 60. The controller also reads the measurement values of the throughflow meters 12, 22 and the temperature sensors 17, 18, 27, 28. Consequently, it is possible for the controller 60 both to control the preparation of coffee beverages or other hot beverages during normal operation and to carry out limescale removal from the continuous flow heaters 10, 20 by the limescale removal system 40. A corresponding control circuit 60 can be implemented, in a manner which is known per se, using a programmable processor 62.

Two-stage regulation of the hot water temperature can be realized by the controller 60. In a so-called feed-forward regulation operation, the input temperature and the flow quantity are detected and the electrical heating power is preset using the known heating capacity of water. In an additional fine regulation operation, the output temperature is measured and the heating power is accordingly adjusted (feedback regulation). The cycle time is dealt with by the feed-forward regulation operation as a control delay, the set-point temperature is reached more quickly. The additional adjustment on the basis of the actual temperature results in more accurate regulation of the output temperature and also prevents production-related temperature differences between different continuous flow heaters of a series. The temperature which is roughly preset by the feed-forward regulation operation can lie somewhat below the desired set-point temperature, with the result that the difference from the desired set-point temperature is then overcome by the second regulation control stage, the feedback regulation operation on the basis of the measured actual temperature.

The continuous flow heater 10 is heated up and then cooled down again for each individual beverage drawing operation. During operation, a heating-up phase 126, 126' of the continuous flow heater 10 is initially performed. The drainage valve 16 is opened over this time. The heater 114 of the continuous flow heater 10 is turned off before the end of a hot water drawing operation, with the result that the water temperature is already dropping slightly toward the end. After the end of the hot water drawing operation, the drainage valve 16 is opened once again and the continuous flow heater is cooled down with the heater 114 switched off. The formation of limescale is therefore reduced owing to the rapid reduction in the temperature in the continuous flow heater 10.

Figure 3:
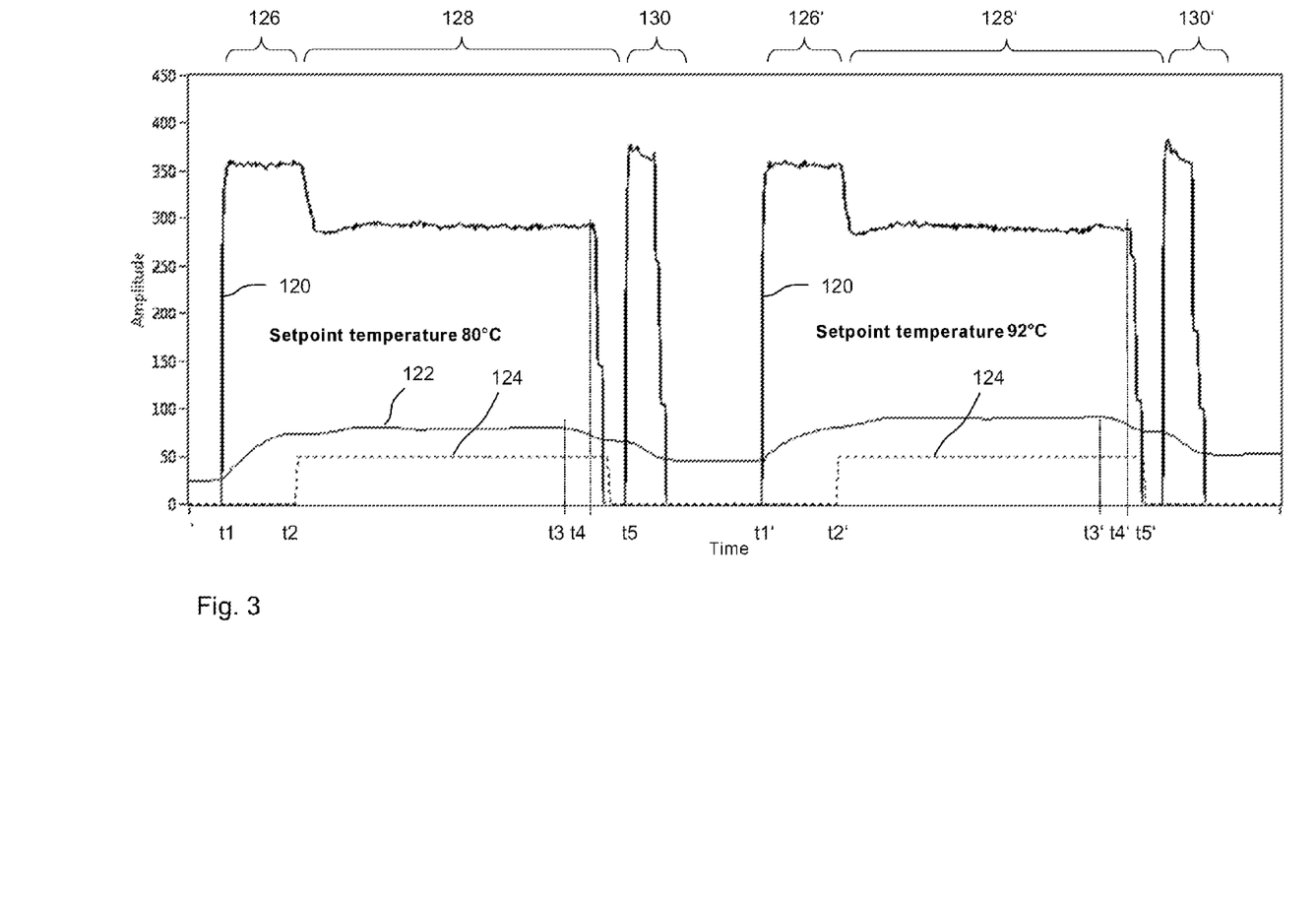
FIG. 3 shows a measurement graph of the profile of the throughflow quantity and water temperature with respect to time during a beverage drawing operation.

FIG. 3 shows the profiles of the throughflow rate over time, the temperature profile and also the switching state of the drainage valve 16. Here, the drainage valve 16 is designed as a solenoid valve which is open when no current is applied. The measurement curve identified by reference sign 120 indicates the profile of the throughflow rate which is measured by the throughflow meter 12. The "amplitude" is indicated in the unit ml/min. The measurement curve 122 is the temperature curve which is measured by the temperature sensor 18 at the output of the continuous flow heater 10. The signal curve 124 indicates the coil current for the drainage valve 16.

At the beginning of a product drawing operation, the water pump 11 is switched on and pumps water from the supply line 30 in the direction of the continuous flow heater 10. Since no current is applied to the drainage valve 16, that is to say said drainage valve is open, the water flows, in a manner arriving from the continuous flow heater 10, into the drain via the line 14. The valves 15a, 15b and 15c are closed in the process. A throughflow rate of approximately 330 ml/min is established. At the same time, the heater 114 of the continuous flow heater 10 is switched on at the time t1. The heating-up phase 126 of the continuous flow heater begins. In this phase, the temperature 122 increases up to an established set-point temperature which is 80° for the first product drawing operation.

The set-point temperature is reached at the time t2. The drainage valve 16 is now closed (coil current on) and the valve 15b is opened, with the result that the now sufficiently hot water is no longer conducted to the drain but rather to the brewing assembly 50. The phase 128 of preparing a coffee beverage, which is output at the outflow 55, begins. By virtue of closing the drainage valve 16 and opening the valve 15b, the flow resistance increases since the heated water now no longer directly reaches the drain but rather is conducted through the brewing chamber 50. For this reason, the throughflow rate drops somewhat to approximately 300 ml/min. The water temperature 102 is kept constant by regulation of the heating power of the continuous flow heater 10 within the scope of control precision.

Shortly before the end of the product drawing operation, the heating arrangement 114 of the continuous flow heater 10 is switched off at a time t3. At this time, approximately 90% of the provided quantity of heat has already flowed through the continuous flow heater and been output to the outlet 55. By way of example, the pre-specified quantity of water for a filter coffee can be 125 ml. The volume is determined by the throughflow meter 12 which is read by the controller 60. The controller 60 therefore switches off the heating arrangement 114, after approximately 112.5 ml of water have passed through. Exact compliance with this value is not essential. For example, in the case of a product drawing operation for 125 ml, the heating arrangement 114 can be switched off roughly in the range of between 105 ml and 120 ml.

The water temperature 122 at the output of the continuous flow heater 10 begins to drop after the heating arrangement 114 is switched off. However, water is further conveyed through the continuous flow heater. At a time t4 thereafter—the output temperature has already dropped by approximately 15° C. at this time—the water pump 11 is turned off. The throughflow rate drops rapidly until the water pressure in the system has reduced. The throughflow through the continuous flow heater 10 comes to a stop and the temperature remains constant since the continuous flow heater 10 is not cooled further by the supplied fresh water. The drainage valve 16 is now open (coil current off). The valve 15a between the continuous flow heater 10 and the brewing assembly 50 is closed. The product drawing operation 128 is concluded.

At a once again somewhat later time t5, the water pump 11 is once again briefly turned on and conveys further fresh water through the continuous flow heater 10, the heating arrangement 114 of which is or remains switched off. Owing to the reinstated flow of cold water, the continuous flow heater 10 is again cooled down to approximately 45° C., that is to say a temperature at which temperature-related limescale deposition no longer takes place. The water pump 11 is switched on, the drainage valve 16 remains open, the throughflow rate 120 drops again until the water flow comes to a stop. The appliance is ready for preparing a further hot beverage.

FIG. 3 subsequently shows, by way of example, a second product drawing operation. It begins with a new heating-up phase 126' at the time t1' by switching on the heating arrangement 114 and the pump 11. This time, the target temperature is 92° C. since different target temperatures can be pre-specified for different types of hot beverages. When the target temperature is reached, the heating-up phase 126' is completed and a new phase 128' of the product drawing operation begins with the drainage valve 16 being closed (coil current on) and the valve 15b being open. Shortly before the end of said phase, the heating arrangement 114 is switched off at time t3': the water temperature 122 begins to drop again. When the pump is deactivated at the time t4', the phase 128' of the product drawing operation ends. The drainage valve 16 is opened again, the valve 15b is closed. In the subsequent post-cooling phase 130', the pump is once again activated at time t5' in order to post-cool the continuous flow heater 10.

Figure 4:
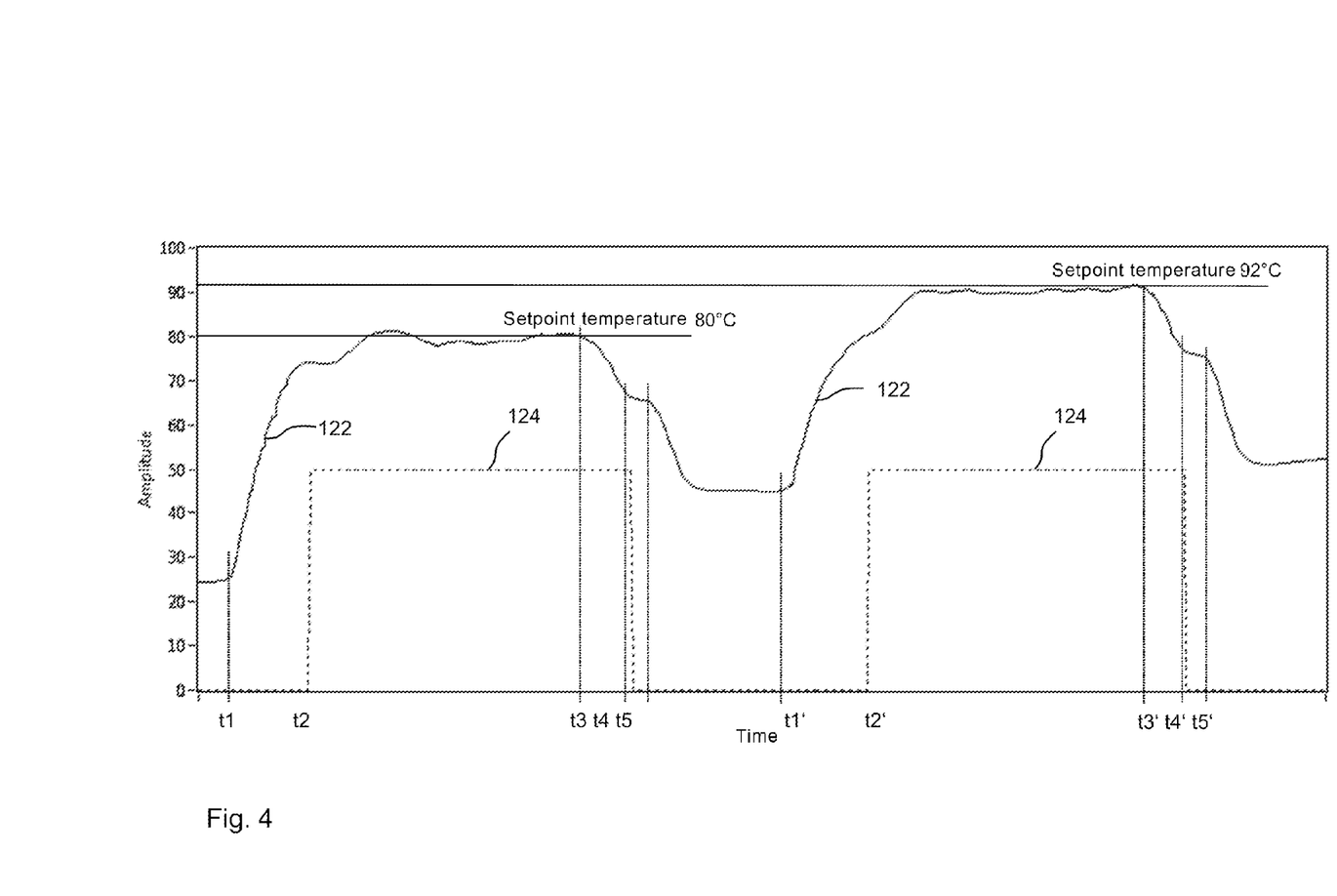
FIG. 4 shows a further measurement graph in which the temperature profile is illustrated on a larger scale.

FIG. 4 shows the same temperature profile once again on an enlarged scale for better understanding. Here, the water temperature at the output of the continuous flow heater in ° C. is indicated as the "amplitude".

Figure 5:
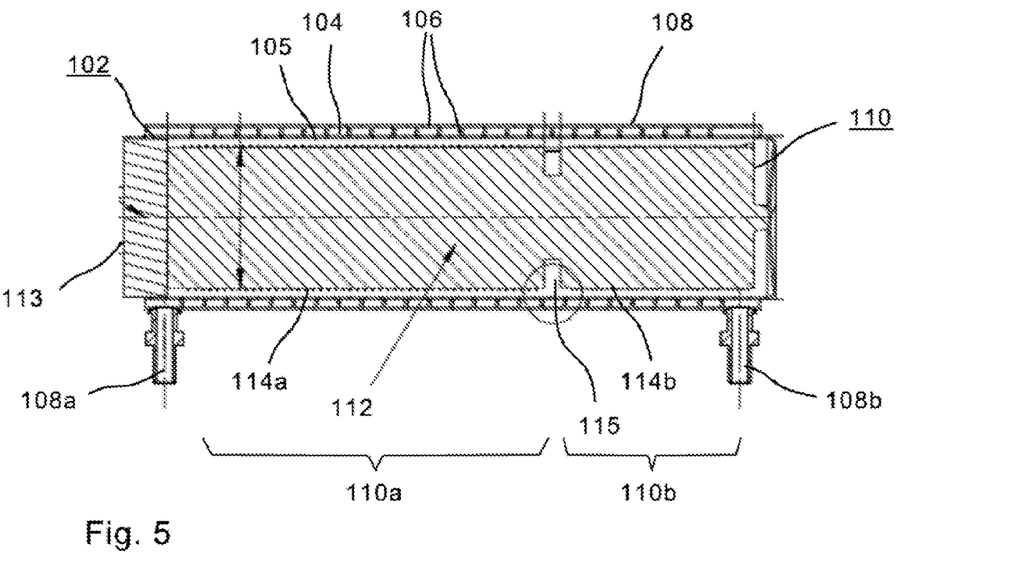
FIG. 5 shows a cross-section through a continuous flow heater in a second exemplary embodiment.

A second exemplary embodiment of a continuous flow heater 10, 20 is shown in FIG. 5. Here, identical and identically acting parts are provided with the same reference signs as in the continuous flow heater in FIG. 2. In the continuous flow heater shown in FIG. 5, the inner body 102 has a non-ribbed, smooth lateral surface 104 composed of stainless steel. The outer jacket 108 is likewise composed of stainless steel and the helical rib arrangement 106 is formed on the inner side of said outer jacket, which inner side faces the inner body 102, so that a flow duct which runs in a helical manner between the inner body 102 and the outer jacket 108 is produced for the supply water to be heated, as in the first exemplary embodiment too. A seal between the inner body 102 and the outer jacket 108 is required.

The ceramic body 112 of the heating unit 110, around which the heating coils 114a, 114b run, has a larger circumference than in the first exemplary embodiment, with the result that the remaining annular gap 105 between the ceramic body 112 and the thin-walled stainless steel sleeve 104 of the inner body 102 turns out to be substantially narrower. As in the first exemplary embodiment, the annular gap 105 is also filled with compressed magnesium oxide for electrically insulating the heating coils 114a, 114b and for thermally bridging the annular gap 105. The two heating regions 110a, 110b are additionally thermally and electrically isolated by a gap spacing which is formed by an annular groove 115 in the outer circumference of the ceramic body 112. The figure likewise indicates that the helically running heating wires 114a, 114b of the two heating regions 110a, 110b have different cross sections. The heating coil 114a of the first heating region 110a has a larger cross section than the heating coil 114b of the second heating region 110b since first said heating coil is designed for a higher electrical power. The electrical connections 113 for the first and the second heating coil 114a, 114b are located on the left-hand end side of the heating cartridge, as in the first exemplary embodiment too.

The invention claimed is:

1. An apparatus for preparing freshly brewed hot beverages, comprising
   at least one hot water generator (10);
   a brewing apparatus (50) to which hot water from the hot water generator (10) is suppliable, the hot water generator (10) is a continuous flow heater;
   a controller (60) configured to actuate the continuous flow heater (10) in such a way that the continuous flow heater (10) is switched on in order to draw a pre-specified quantity of hot water and is switched off shortly before the quantity of hot water is completely output, so that a temperature (122) of the hot water at an output of the continuous flow heater (10) declines at an end of a drawing operation;
   a drainage valve (16) which is arranged downstream of the continuous flow heater (10) in the throughflow direction and designed as a controllable directional valve by which water flowing through the continuous flow heater (10) is conductable directly into a wastewater line or a wastewater collection container instead of in a direction of the brewing apparatus (50);
   the controller being further configured to close a directional valve (15b) between the continuous flow heater (10) and the brewing apparatus (50) after the end of a hot water drawing operation, to open the drainage valve (16) and, when the continuous flow heater (10) is switched off, to once again activate a flow of water through the continuous flow heater (10) in order to cool the continuous flow heater (10).

2. The apparatus as claimed in claim 1, wherein the controller (60) is configured to open the drainage valve (16) during a heating-up phase (126, 126') of the continuous flow heater (10) and to conduct water arriving from the continuous flow heater (10) into the wastewater line or the wastewater collection container.

3. The apparatus as claimed in claim 2, in which the heating-up phase is executed each time a hot beverage is drawn.

4. The apparatus as claimed in claim 1, wherein the controller (60) is programmed such that the heating arrangement (114) is switched off after between 85% and 95% of the pre-specified quantity of hot water has flowed through the continuous flow heater (10).

5. The apparatus as claimed in claim 1, wherein the continuous flow heater (10) comprises a cylindrical inner body (102), an outer jacket (108) which surrounds said cylindrical inner body, and a helically running flow duct (106) for water to be heated formed between a lateral surface (104) of the inner body (102) and an inner side of the jacket (108).

6. The apparatus as claimed in claim 5, comprising an electrical heating arrangement (114) comprising a heating resistor which runs within the cylindrical inner body (102) in a helical manner around a center axis of said cylindrical inner body.

7. The apparatus as claimed in claim 1, further comprising a water pump (11) which conveys water from a supply line (30) to the continuous flow heater (10).

8. A method for preparing freshly brewed hot beverages, the method comprising:
   generating hot water by a continuous flow heater (10);
   supplying the hot water to a brewing apparatus (50);
   switching on the continuous flow heater (10) for drawing a pre-specified quantity of the hot water and switching off the continuous flow heater (10) shortly before the quantity of hot water is completely output, so that a temperature (122) of the hot water at an output of the continuous flow heater (10) is declining at an end of the drawing operation;
   after the end of a hot water drawing operation, when the continuous flow heater (10) is switched off, once again activating a flow of water through the continuous flow heater in order to cool the continuous flow heater and, in the process, the water is conducted directly into a wastewater line or a wastewater collection container instead of in a direction of the brewing apparatus (50) by a drainage valve (16).

9. The method as claimed in claim 8, further comprising directly conducting the water flowing through the continuous flow heater (10) directly into a wastewater line or a wastewater collection container instead of in a direction of the brewing apparatus (50) by a drainage valve (16) during a heating-up phase (126, 126') of the continuous flow heater (10).

10. The method of claim 9, wherein after the end of a hot water drawing operation, when the continuous flow heater (10) is switched off, a flow of water through the continuous flow heater is once again activated in order to cool the continuous flow heater and, in the process, the water is conducted directly into a wastewater line or a wastewater collection container instead of in the direction of the brewing apparatus (50) by a drainage valve (16).

* * * * *